United States Patent [19]

Pressaco et al.

[11] Patent Number: 4,499,812
[45] Date of Patent: Feb. 19, 1985

[54] SERVO-MOTOR FOR POWER-ASSISTED BRAKING

[75] Inventors: Pierre Pressaco, La Courneuve; Jean-Jacques Carré, Le Raincy, both of France

[73] Assignee: Societe Anonyme D.B.A., Paris, France

[21] Appl. No.: 540,076

[22] Filed: Oct. 7, 1983

[30] Foreign Application Priority Data

Oct. 29, 1982 [FR] France ............... 82 18184

[51] Int. Cl.³ .............................................. F15B 9/10
[52] U.S. Cl. ................................ 91/376 R; 91/369 A; 92/165 PR; 92/168; 92/166
[58] Field of Search .............. 92/169.2, 169.3, 169.4, 92/168, 166, 165 PR; 91/376 R, 369 A

[56] References Cited

U.S. PATENT DOCUMENTS

| | | | |
|---|---|---|---|
| 1,765,760 | 6/1930 | Duty et al. | 92/165 R |
| 4,393,750 | 7/1983 | Wagner | 91/376 R |
| 4,398,449 | 8/1983 | Takayama et al. | 91/376 R |
| 4,409,885 | 10/1983 | Reinartz et al. | 92/168 |
| 4,433,614 | 2/1984 | Takeuchi et al. | 92/166 |

FOREIGN PATENT DOCUMENTS

| | | |
|---|---|---|
| 1277047 | 9/1968 | Fed. Rep. of Germany . |
| 2442166 | 6/1980 | France . |
| 90767 | 7/1981 | Japan ........................ 92/169 |
| 2009871 | 6/1979 | United Kingdom . |

Primary Examiner—Robert E. Garrett
Assistant Examiner—Richard S. Meyer
Attorney, Agent, or Firm—Larry J. Palguta; Ken C. Decker

[57] ABSTRACT

The two chambers (8, 9) on either side of the movable wall structure forming a piston (7) are each sealingly delimited internally by a first and a second flexible impervious walls (23) which connect the central hub part (11) incorporating the control valve (12) to the central annular end zones (22 ; 24) of the corresponding end walls (2 ; 3) of the housing, the central zones delimited peripherally by said flexible walls being interconnected by at least a passage (39) traversing the central hub part, thus providing in the center of the housing a neutral cylindrical zone (32). In this neutral zone (32) there extend force-transmitting elements (38) which have at their ends fastening means (40), for example with assembly flanges (41, 42), and which slidingly pass through said passages (39) formed in the body of the central hub part (11), thus in no way interfering with the control and fluid actuation system of the servo-motor.

13 Claims, 3 Drawing Figures

FIG_1

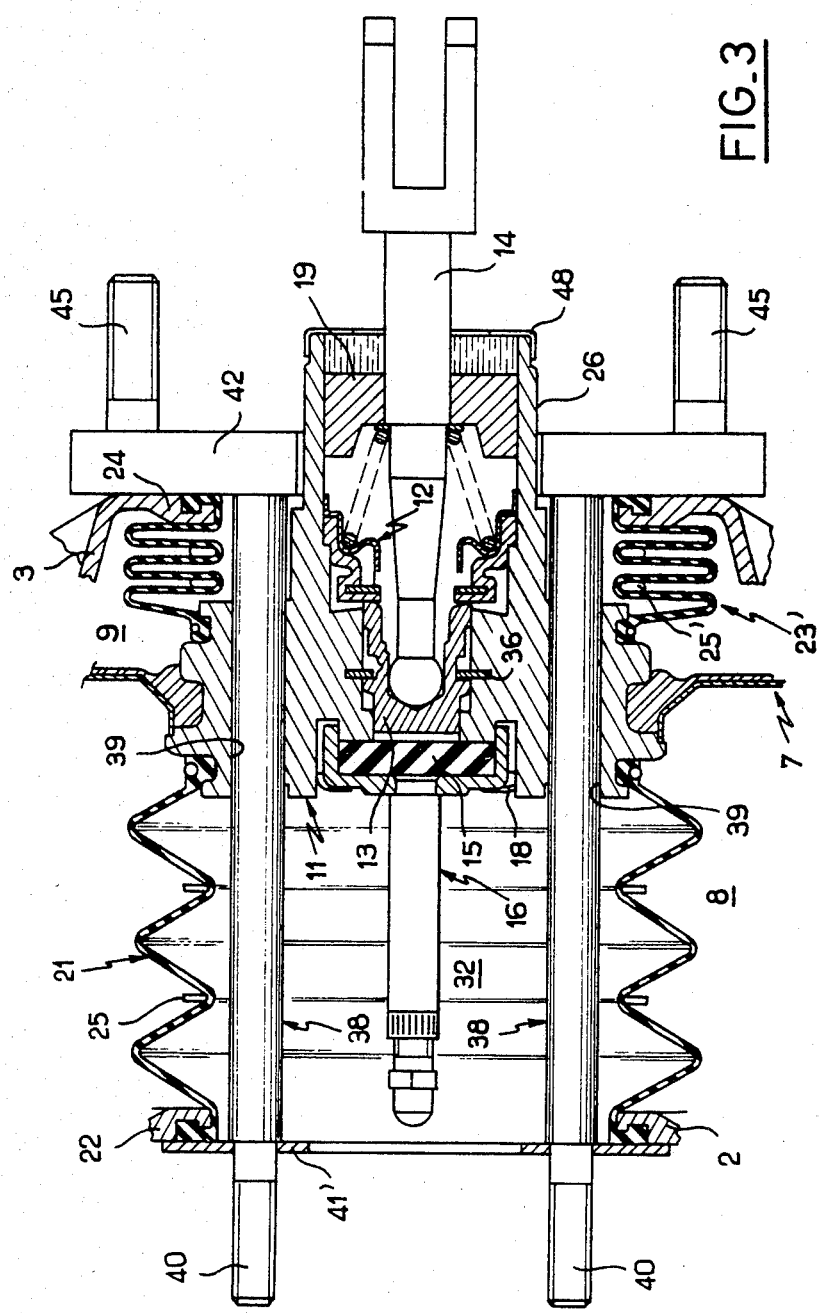
FIG_3

SERVO-MOTOR FOR POWER-ASSISTED BRAKING

The present invention relates to servo-motors for power-assisted braking on motor vehicles, more especially of the vaccum type, which are intended for actuating a master cylinder of the braking circuit of the vehicle, of the type comprising a housing, a wall structure movable axially in this housing and dividing the latter into a first chamber and a second chamber, and a control valve located in a central hub part displaceable in unison with the movable wall structure, so as to establish selectively, under the action of an input member, connected typically to a brake pedal, communication between the two chambers in order to control axial displacement, from a rest position, of the movable wall structure and of the central hub part connected functionally to the primary piston of a master cylinder associated with the servo-motor on the side of the latter opposite the input member.

In conventional servo-motors of this type, such as those described in French Pat. No. 1,549,121 or in French Patent Application 2,499,923, the front chamber of the housing, typically the so-called vaccum chamber, extends over the entire cross-section of the front part of the housing, and the rear chamber, or working chamber, is delimited internally by the central hub part, the latter having a rear portion of reduced diameter, in which extends the input member, interacting in a sealing sliding engagement with the central annular zone of the rear shell of the housing.

There is an object of the present invention to propose an arrangement for a servo-motor, of the general type defined above, which provides in the housing an axial central zone which is "neutral" or inactive, that is to say does not participate in the system of pneumatic control or actuation exchanges of the servo-motor, and in which the central hub part moves in such a way that the chambers of the housing essentially affect the actual movable wall structure forming the piston, thereby permitting a central guiding of the piston/central hub part assembly and further offering great versatility as regards the methods of coupling the servo-motor to the master cylinder on one side of the housing and/or to the fixed mounting wall for the servo-motor/master cylinder assembly on the other side of the housing.

In order to meet these object and others, according to a feature of the invention, the chambers of the housing are sealingly delimited internally by a first and a second impervious flexible walls, respectively, which connect the periphery of the central hub part to the corresponding end wall of the housing, the central hub part comprising at least one transversing passage interconnecting permanently the central zones delimitated externally by said first and second flexible walls.

According to another feature of the invention, the servo-motor incorporates at least one stationary guide element which extends axially, radially inwardly of the first and second flexible walls, and which cooperates with the central hub part so as to guide the latter in its axial displacement.

It is known, moreover, that, in a conventional cantilever mounting of a master cylinder/power-assistance servo-motor assembly on a stationary wall of the vehicle, with the servo-motor interposed between the master cylinder and the stationary wall, the operating reaction forces are transmitted essentially by the shells or end walls constituting the servo-motor housing, with the known attendant disadvantages meaning that a compromise has to be reached between the necessary rigidity and the desired lightness of the housing.

With this in mind, it has been proposed, particularly in GB Patent Application 2,009,871, to have force-transmitting elements between the master cylinder and the fixed mounting wall in the form of tie rods which axially interconnect the shells of housing by passing through them and which pass through the movable wall structure separating the two chambers of the housing, means being provided to connect this movable wall structure in a leak-proof manner to the force-transmitting elements or tie rods extending axially through each of the chambers of the housing. This technique present significant problems as regards leak-tightness between the tie rods and the movable wall structure and between the ends of the tie rods and the respective shells through which they pass to connect them, on the outside of the housing, to the master cylinder and to the fixed mounting wall of the assembly.

It has also been proposed, particularly in GB Patent Application 2,022,209, a force-transmitting element, this time in the form of a central tube, interconnecting the two shells internally. This technique, in which the central tube also extends within the two chambers of the housing, in turns presents problems of leak-proofing and connection between the central hub part, moving within the central tube, and the movable diaphragm wall structure located radially outwardly of the central tube.

There is a further object of the present invention to obviate these drawbacks by proposing a servo-motor structure provided with force-transmitting elements extending axially through the housing in a simple and reliable arrangement with a low production cost and presenting no special sealing problems nor any increase in the complexity of the internal control and actuation members of the servo-motor.

In order to meet this object, according to another feature of the invention, the servo-motor further incorporates at least one force-transmitting element which extends axially through the housing, radially inwardly of the first and second impervious flexible walls, in the above-mentioned "neutral" zone, passing through said traversing passage formed in the central hub part.

Utilising in this way the neutral axial central zone of the housing, which is typically permanently connected to the atmosphere, the force-transmitting element, in practice at least two tie rods arranged symmetrically in relation to the general axis of the housing, can extend through the body of the central hub part radially outwardly of the central region of this hub part accommodating the control valve, without raising any sealing problems either with the movable wall structure separating the two chambers of the housing or with the end walls of the latter, because this force-transmitting element passes through neither of the chambers of the housing, and without interfering in any way with the system of fluid exchanges of the servo-motor, while contributing to the axial guidance of the central hub part and therefore of the movable wall structure connected peripherally to the latter, and while allowing, on the outside of the housing and without requiring any modification of the latter, all possible matchings with the various fitting layouts required for the means for fitting the master cylinder/servo-motor assembly in situ in a vehicle.

Other features and advantages of the present invention will emerge from the following description of embodiments given by way of illustration, but not in a limiting way, the description being made in relation to the attached drawings in which:

FIG. 3 is a sectional view similar to FIG. 2, showing an alternative embodiment of the servo-motor according to the invention.

In the following description and in the drawings, identical or similar elements in the various alternative embodiments have the same reference numerals, possibly given a prime.

Figure 1:
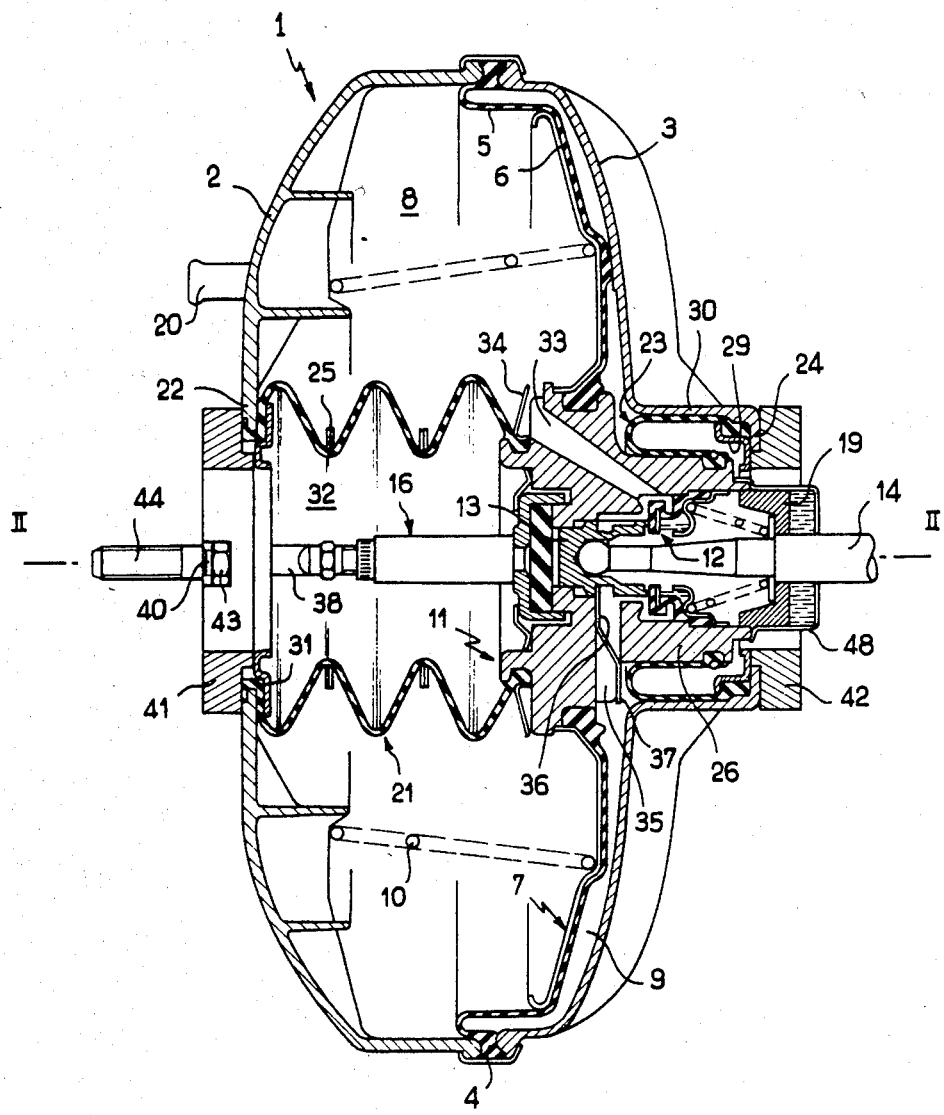
FIG. 1 is a cross-sectional view of a power-assistance servo-motor according to the invention.

The power-assistance servo-motor according to the invention generally comprises a housing 1 formed by joining together peripherally two shells, respectively a front shell 2 and a rear shell 3, made of thin sheet-metal or plastic material. In the embodiment illustrated, the two shells 2 and 3 are each made in one piece, of plastic material, and are assembled together peripherally by a crimped ring 4, the facing joined annular ends of the two shells retaining between them the peripheral rim of an elastomeric diaphragm 5 which constitutes, together with a diaphragm support plate 6 associated with it, the movable wall structure forming a piston, designated as a whole by reference numeral 7, which divides the interior of the housing into a first front chamber 8 and a second rear chamber 9. The movable wall structure 7 is resiliently biased towards the rear shell 3, in the position of rest of the servo-motor, by a return spring 10 which bears on the front shell 2.

The central or inner zone of the movable wall structure 7 is fixed to a central hub part 11 enclosing a three-way control valve 12 of conventional type, such as is described in relation to FIG. 1 in French Patent Application 2,499,923 mentioned above, the content of which is assumed to be incorporated here for reference, and the plunger or sliding axial stem 13 of which is connected, on the one hand, to the input control member or rod 14 (intended to be connected to the brake pedal) and, on the other hand, selectively cooperates with a reaction disc 15 located in an end cup of an output member 16 of the servo-motor, intended to be coupled to the primary piston of a master cylinder 17 (FIG. 2) connected to the front shell 2 of the housing 1, as will be seen below. The output member 16 is retained in the front zone of the central hub part 11 by a resilient washer 18. The central hub part 11 is provided conventionally, at its rear, with a double filter 19 to avoid contamination of the atmospheric air which the valve 12 introduces selectively, following the displacement of the plunger 13 under the effect of the input member 14, into the rear or working chamber 9, the front chamber 8 being maintained permanently under a vacuum in the embodiment shown, the front shell 2 being provided with a nipple 20 for connecting the servo-motor to a vacuum source of the vehicle (not shown).

According to the invention, the front chamber 8 is sealingly delimited internally by a first impervious flexible wall 21 which extends between the central annular end zone 22 of the front shell 2 and the periphery of the adjacent (front) end of the central hub part 11. Similarly, the rear chamber 9 is sealingly delimited internally by a second impervious flexible wall 23 which extends between the central annular end zone 24 of the rear shell 3 and the periphery of the corresponding (rear) axial end of the central hub part 11. In this way, according to the invention, since the flexible walls have a substantially cylindrical, e.g. elliptical cross-section, each chamber 8 or 9 has a substantially annular working volume essentially affecting the movable wall structure 7, but conversely not affecting at all the front face of the central hub part 11.

The first flexible sealing wall 21 advantageously consists of elastomeric bellows reinforced by metallic or high-strength plastic rings 25 located externally in the depressions of the bellows. In the embodiment shown in FIGS. 1 and 2, the second flexible sealing wall 23 consists of a rolling diaphragm, the inner rim of which is locked elastically in a peripheral groove in a circular rear portion of reduced diameter or elliptical 26 of the central hub part 11 and the outer rim of which is retained between an inner annular assembly plate 29 and the shoulder defined by the annular central end zone 24 forming a collar folded inwards at the end of a central tubular prolongation 30 of the rear shell 3 surrounding, radially outwardly, the diaphragm 23 and the rear portion of reduced diameter 26 of the central hub part 11. In a similar way, the front end of the bellows or first flexible sealing wall 21 is held gripped against the inner face of the central annular end zone 22 of the front shell 2 by means of an inner annular assembly plate 31. The retention of the assembly plates 29 and 31 in place will be explained below. With such an arrangement, according to the invention, there is provided in the servo-motor a neutral central tubular zone 32 delimited externally by the first and second flexible sealing members 21 and 23, not participating in any way in the fluid exchange system of the servo-motor and, in particular, being separated completely from the chambers 8 and 9 of the servo-motor. The control valve 12, arranged centrally within the portion of reduced with 26, communicates with the front vacuum chamber 8 via a channel 33 which opens into this front chamber 8 at the periphery of the central hub part 11 between the assembly zone of the front bellows 21 and the assembly zone of the inner part of the movable wall structure 7. A perforated profiled annular plate 34 is mounted elastically on the assembling rim of the front bellows 21 on the central hub part 11 to prevent any risk that the diaphragm of the bellows 21 will mask the orifice via which the passage 33 opens into the chamber 8. The valve 12 communicates conventionally with the rear working chamber 9 via a radial passage 35 opening at the periphery of the central hub part 11 at a zone between the rolling diaphragm 23 and the inner rim of the diaphragm 5 of the movable wall structure 7. Fitted in lateral grooves in the passage 35 is the key 36 for controlling the stroke of the plunger 13. Advantageously, this key 36 is prolongated radially outwards, in the passage 35, by a perforated end portion 37 which likewise makes it impossible for the fold of the diaphragm 23 to mask the passage 35, and which may constitute a return stop, contacting the rear shell, for the movable assembly piston 7/central hub part 11.

According to an aspect of the invention, the tubular central zone 32 is utilised for arranging, symmetrically in relation to the general axis of the housing, at least one pair of guide, e.g. tie rods 38 which pass axially through the housing 1 and which each extend through an axial through-bore 39 formed in the body of the central hub part 11, between the peripheral zone of the latter where the diaphragms 21, 5 and 23 are connected and the central part of reduced diameter 26 accommodating the valve 12. The transverse dimension of at least one of the bores 39 is such as to allow loose sliding of the associated tie rod 38, thus establishing, without any sealing member there, permanent free communication between the two axially opposite central zones of the servomotor, and the guiding tie rods 38, made stationary by being fastened at their ends to structures outside the housing 1, ensure the axial guidance of the central hub part 11 and consequently of the movable wall structure forming a piston 7. In an alternative embodiment (not shown) the other of said transversing bores 39 comprises, adjacent its rear end, a portion of reduced diameter so as to ensure there a precise and guided sliding of the central hub part on the corresponding guide tie rod 38.

Figure 2:
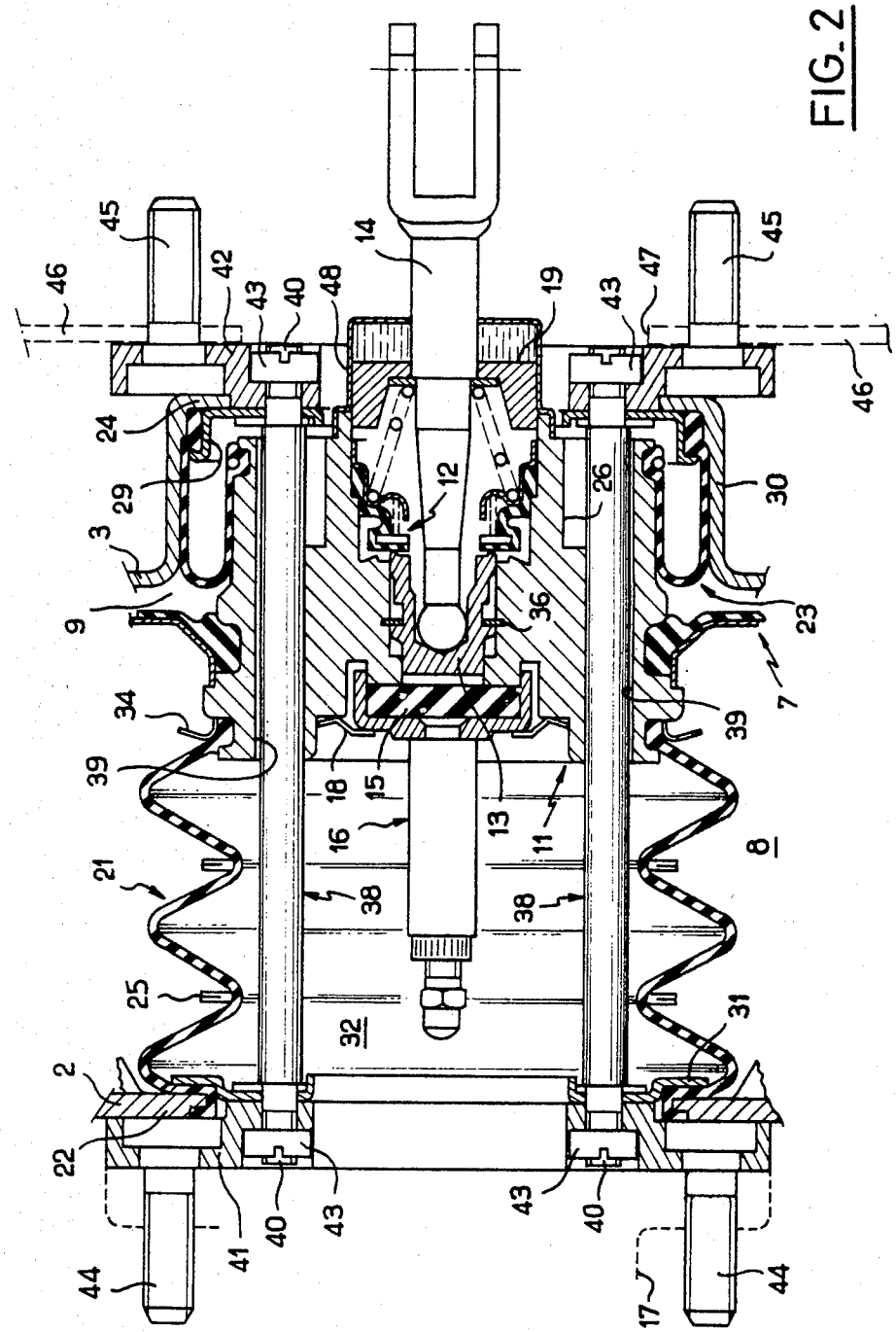
FIG. 2 is a partial sectional view on a larger scale along the plane II—II of FIG. 1.

As will be seen better in FIG. 2, in the embodiment shown, each tie rod 28 has, at each end, a threaded end part of reduced diameter 40 passing through holes aligned in the corresponding assembly plate 29 or 31 and in an annular flange 41 or 42 which has a central part penetrating slightly into the central orifice delimitated by the central annular end zones 22 or 24 of the shells of the housing, so as to cooperate in abutment with the retaining plates 31 or 29, whilst bearing externally against said central annular end zones 22 and 24 of the shells of the housing. Each flange 41 and 42 has spot-faced portions forming recesses and shoulders for nuts 43 screwed onto the threaded ends 40 of the tie rods 38 and thus providing the means of attachment of the flanges 41 and 42, the retaining plates 31 and 29 and of the tie rods 38 to the housing. The flanges 41 and 42 also have opposite spot-faced portions forming recesses and shoulders for fastening screws 44 and 45 which respectively provide the means of attachment of the master cylinder 17 to the housing 1 and of the master cylinder/housing assembly 1 to a fixed wall 46 of a vehicle, this fixed wall being provided with an orifice 47 allowing passage of the rear end cover 48 of the central hub part 11 containing the filter 19, and of the actuating rod 14. With such an assembly, it will be noted that, according to a feature of the invention, the tie rods 38 not only extend all in the neutral central zone of the housing but also do not pass through the shells 2 and 3 of the housing and transmit the reaction forces of the master cylinder 17 directly to the mounting wall 46 via the end flanges 41 and 42 only. It will also be realised that, depending on the centre-to-centre distances provided between the fastening bolts 45 and depending on the number of fastening bolts required, the dimensions of the inner flange 42 can be selected accordingly, without the need to modify the structure of the shells 2 and 3 of the housing 1.

the embodiment illustrated in FIG. 3 differs essentially from the preceding embodiment in that the (rear) second flexible sealing wall consists, here, of a second reinforced bellows 23', similar to the front bellows 21, the outer end rim of which is retained between the central annular end zone 24 of the rear shell 3 and the annular flange 42, the front end rim of the bellows 23' being engaged on the periphery of the middle zone of the central hub part 11, the valve passage 35 opening, as before, between these rear bellows 23' and the central assembly zone of the movable wall structure 7. In the simplified embodiment shown in FIG. 3, the threaded end 40 of the tie rods 38 on the same side as the master cylinder is extended so as to serve directly for attaching the master cylinder to the housing, a simple annular plate 41' being interposed between the shoulder connecting the threaded end 40 to the body of the tie rod 38 and the flange of the master cylinder, so as to grip the end rim of the front bellows 21 against the central annular end zone 22 of the front shell 2.

Although the present invention has been described in relation to particular embodiments, it is not limited thereby, but on the contrary is capable of modifications or alternative forms which will appear to a person skilled in the art.

We claim:

1. A servo-motor for power-assisted braking, comprising a housing (1) having opposite end walls, a wall structure movable axially in said housing and dividing the latter into a first chamber and a second chamber, and a control valve located in a central hub part displaceable in unison with the movable wall structure, so as to establish, under the action of an input member, selective communication between said two chambers, characterized in that said chambers of said housing are sealingly delimited internally by a first flexible wall and a second flexible wall, respectively, which connect said central hub part to the corresponding said end wall of the housing, and in that said central hub part includes at least one transversing passage interconnecting permanently the central zones delimited externally by said first and second flexible walls.

2. A servo-motor according to claim 1, characterized in that said first and second flexible walls extend respectively between said central hub part and a central annular end zone of the corresponding said end wall of said housing and have a substantially cylindrical configuration.

3. A servo-motor according to claim 1, characterized in that it comprises a first fluid passage and a second fluid passage which respectively establish fluid flow communication between said valve and said first and second chambers and are formed in said central hub part and which each open radially onto the periphery of the latter.

4. A servo-motor according to claim 1, characterized in that said central hub part comprises a portion of reduced diameter radially inwardly of said first and second flexible walls and in which said valve is accommodated.

5. A servo-motor according to claim 1, characterized in that it includes at least one stationary guide element extending axially, radially inwardly of said first and second flexible walls and cooperating in sliding engagement with said central hub part.

6. A servo-motor according to claim 5, characterized in that said transversing passage extend axially through said central hub part, radially outwardly of said valve, said stationary guide element (38) slidingly extending within said transversing passage.

7. A servo-motor according to claim 1, characterized in that it incorporates at least one force-transmitting element which extends axially through said housing, radially inwardly of said first and second flexible walls and which passes through said transversing passage.

8. A servo-motor according to claim 7, characterized in that said force-transmitting element has at each end a fastening means.

9. A servo-motor according to claim 7, characterized in that said force-transmitting element is a tie rod.

10. A servo-motor according to claim 9, characterized in that it incorporates at least one pair of said tie rods, arranged symmetrically in relation to the general axis of the housing.

11. A servo-motor according to claim 10, characterized in that said tie rods of said pair are interconnected at at least one of their axial ends by an annular structure incorporating fastening means.

12. A servo-motor according to claim 11, characterized in that said tie rods of said pair are interconnected at each of their axial ends by said annular structure provided with fastening means.

13. A servo-motor according to claim 11, characterized in that said annular structure participates in assembling the adjacent said flexible wall onto said housing.

* * * * *